United States Patent
Abadie et al.

(10) Patent No.: US 9,515,722 B2
(45) Date of Patent: Dec. 6, 2016

(54) DISTRIBUTED MANAGEMENT OF AIRCRAFT-GROUND COMMUNICATIONS IN AN AIRCRAFT

(71) Applicant: Airbus Operations (S.A.S.), Toulouse (FR)

(72) Inventors: Julien Abadie, Toulouse (FR); Pierre Cuq, Ayguesvives (FR); Stéphane Papet, Vigoulet-Auzil (FR); Nicolas Rohrbacher, Colomiers (FR); Guillaume Demarquet, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 28 days.

(21) Appl. No.: 14/280,049

(22) Filed: May 16, 2014

(65) Prior Publication Data
US 2014/0341107 A1    Nov. 20, 2014

(30) Foreign Application Priority Data
May 16, 2013    (FR) .................................... 13 54388

(51) Int. Cl.
| | | |
|---|---|---|
| H04B 7/185 | (2006.01) | |
| H04L 12/24 | (2006.01) | |
| H04L 12/26 | (2006.01) | |
| H04L 29/12 | (2006.01) | |

(52) U.S. Cl.
CPC ....... *H04B 7/18506* (2013.01); *H04L 41/0806* (2013.01); *H04L 41/082* (2013.01); *H04L 43/0811* (2013.01); *H04L 61/35* (2013.01); *H04L 61/6022* (2013.01)

(58) Field of Classification Search
CPC . H04B 7/185; H04B 7/18502; H04B 7/18504; H04B 7/18582; H04B 7/18597
See application file for complete search history.

(56) References Cited

U.S. PATENT DOCUMENTS

| | | | | |
|---|---|---|---|---|
| 3,787,665 A | * | 1/1974 | Watson et al. ................ | 370/507 |
| 6,249,913 B1 | * | 6/2001 | Galipeau et al. .............. | 725/76 |
| 6,950,627 B2 | * | 9/2005 | Vicari .......................... | 455/41.2 |
| 8,538,602 B2 | * | 9/2013 | Brot ..................... | G05D 1/0077 |
| | | | | 701/3 |
| 2002/0078138 A1 | * | 6/2002 | Huang ................... | H04L 41/22 |
| | | | | 709/203 |

(Continued)

FOREIGN PATENT DOCUMENTS

| | | |
|---|---|---|
| EP | 2 595 362 A1 | 5/2013 |
| WO | WO 2008/139062 A2 | 11/2008 |

OTHER PUBLICATIONS

French Search Report for Application No. 1354388 dated Jan. 8, 2014.

*Primary Examiner* — Kevin Mew
(74) *Attorney, Agent, or Firm* — Jenkins, Wilson, Taylor & Hunt, P.A.

(57) ABSTRACT

A method of configuring communications management on board an aircraft comprising the implementation of a mechanism for electing a master equipment item in a network of computer equipment items in charge of aircraft-ground communications of the aircraft and of configuring communication management according to the master equipment item. The method enables the applications in charge of the aircraft-ground communications to be distributed between the networked computer equipment items.

14 Claims, 3 Drawing Sheets

(56) References Cited

U.S. PATENT DOCUMENTS

| | | | | |
|---|---|---|---|---|
| 2003/0216135 | A1* | 11/2003 | McDaniel | H04K 3/22 455/410 |
| 2005/0178880 | A1* | 8/2005 | Howe | B64D 37/04 244/10 |
| 2006/0042846 | A1* | 3/2006 | Kojori et al. | 180/65.8 |
| 2006/0187026 | A1* | 8/2006 | Kochis | G06Q 10/08 340/539.13 |
| 2007/0077998 | A1* | 4/2007 | Petrisor | 463/42 |
| 2008/0013502 | A1* | 1/2008 | Clark | G08C 17/00 370/338 |
| 2008/0208399 | A1 | 8/2008 | Pham | |
| 2008/0252459 | A1* | 10/2008 | Butler | G06K 7/0008 340/572.1 |
| 2009/0119431 | A1* | 5/2009 | Porath | B64D 11/0015 710/110 |
| 2010/0134257 | A1* | 6/2010 | Puleston | G06K 7/0008 340/10.4 |
| 2010/0305720 | A1* | 12/2010 | Doll | G05B 19/042 700/86 |
| 2011/0028147 | A1* | 2/2011 | Calderhead et al. | 455/431 |
| 2011/0276199 | A1 | 11/2011 | Brot | |
| 2012/0056784 | A1* | 3/2012 | Xie | H01Q 1/125 342/359 |
| 2013/0024053 | A1* | 1/2013 | Caule | G08B 29/16 701/14 |
| 2013/0111088 | A1* | 5/2013 | Cho | G06F 13/00 710/110 |
| 2014/0018097 | A1* | 1/2014 | Goldstein | G06F 19/3406 455/456.1 |
| 2014/0320321 | A1* | 10/2014 | Loubiere | G02B 27/0179 340/980 |
| 2015/0130593 | A1* | 5/2015 | Mats | G06K 7/10366 340/10.1 |

* cited by examiner

DISTRIBUTED MANAGEMENT OF AIRCRAFT-GROUND COMMUNICATIONS IN AN AIRCRAFT

TECHNICAL FIELD

The present subject matter concerns the field of aircraft-ground communications in aircraft, that is to say communications sent from the aircraft to at least one station on the ground or from at least one station the ground to the aircraft.

BACKGROUND

For the A380 in particular, Airbus has developed a network architecture on board the aircraft based on the NSS (standing for "Network Server System"). Part of the NSS is dedicated to avionic communications. Another part is dedicated in particular to the flight operations domain (this part being referred to as "NSS Flight ops" domain hereinafter).

Thus, the NSS Flight ops domain is connected to the outside world, in particular the operations centers of the airline companies. The aircraft-ground communications between the NSS Flight ops domain and the operations centers of the airline companies are managed by the OWAG system (OWAG standing for "Open World Aircraft Ground"). This type of system is described in document WO 2008/139062.

The OWAG system enables aircraft-ground communications that are transparent in relation to communicating applications of the NSS Flight ops domain and the operations centers of the airline companies.

For example, the OWAG system manages the aircraft-ground communicator, also referred to as the communication or communications, of the NSS Flight ops domain. At present, these means are, among others, Gatelink (WiFi, cellular) and Satcom SBB. This function of managing the communication is provided by an LGCM software component (LGCM standing for "Light Green Communications Manager"), which may be installed on the ANSU-AFMR server of the NSS Flight ops domain.

The OWAG system may furthermore provide an asynchronous service that is robust, centralized and secure for the exchange of data between the aircraft (NSS Flight ops domain) and the ground (operations center of the airline company) This function is provided by an OAMS software component (OAMS standing for "On-board Asynchronous Messaging Server") which may be installed on the ANSU-AFMR server. Furthermore, the OAMS has a counterpart on the ground at the location of operations center of the airline company, called GAMS (standing for "Ground Asynchronous Messaging Server"). The aircraft-ground data communications are thus made between the OAMS and the GAMS in the uplink direction (ground to aircraft) and equally in the downlink direction (aircraft to ground).

The OWAG system may thus provide an interface for the communication applications or those requiring communications to be implemented. These "communicating" applications may be on the aircraft or on the ground. They may use a set of primitive functions to interface with the OWAG system such as "submit data to send", "fetch received data", etc. The set of primitive functions given to the applications to interface with the OWAG is called OAMS API on the aircraft and GAMS API on the ground. The OAMS API is installed on the aircraft on the ANSU-AFMR server but also on the class 3 EFBs (EFB standing for "Electronic Flight Bag") which the pilots have in the cockpit and on which the communicating applications are used.

The OWAG system in particular manages the losses and re-establishments of the aircraft-ground communications, and the interruptions and resumptions on information transformation error. Thus, the OWAG enables the complexity of the "aircraft-ground communications" issue to be concealed from the OWAG client applications.

SUMMARY

In accordance with the subject matter disclosed herein, it has been discovered that the OAMS and LGCM services of OWAG are only executed on a single equipment item: the ANSU-AFMR server of the NSS Flight ops domain. Thus in case of failure or stoppage of the ANSU-AFMR server, the OWAG services are no longer available for the client communicating applications of that server, this being the case even if applications are running on the class 3 EFBs of the cockpit.

It has also been found that there is an increasing number of items of equipment in the cockpit hosting applications wishing to communicate with the ground with the same level of reliability. These are for example tablet computers connected to the on-board network via WiFi or other wireless communication.

The present subject matter lies within this context.

A first aspect of the subject matter concerns a method of configuring communications management on board an aircraft comprising the following steps:
  detecting a communication management configuration event,
  exchanging information relative to at least one election criterion for electing a master equipment item in a network of computer equipment items in charge of the aircraft-ground communications of the aircraft,
  determining a master equipment item according to said exchanged information,
  configuring communication management according to said determined master equipment item.

A method according to the first aspect makes it possible to distribute the applications in charge of the aircraft-ground communications (such as those of the OWAG system, for example such as the LGCM and the OAMS) between the networked computer equipment items (for example that of the NSS Flight Ops domain).

It is also possible to launch the applications in charge of the aircraft-ground communications services no longer on a single on-board equipment item but on some or all of the on-board equipment items. The implementation of a mechanism for determining (or electing) a master equipment item based on a dialog between the different on-board equipment items, makes it possible to execute each communication application (for example LGCM and OAMS) singly (for example on the on-board platform at a given time). Thus, each communication application may be launched on several on-board equipment items, but it only actively executes on a single one of those equipment items at a given time. Furthermore, the same equipment item may, at a given time, implement one or more aircraft-ground communication applications.

A method according to the first aspect makes it possible to withstand the defectiveness of a master equipment item, since in such a scenario, the election mechanism may be implemented in particular to detect the loss of the master equipment item, to designate a new master equipment item (for example in charge of the execution of a communication application), etc.

A method according to the first aspect also enables aircraft-ground communication (for example those of the NSS Flight ops domain) to be placed in common dynamically. Thus, the master equipment item may at the same time manage the aircraft-ground communications of the aircraft and those provided by the equipment items connected to the network from time to time.

In general terms, the availability of the aircraft-ground communications management is increased since it is possible for it no longer to run in centralized manner on a single equipment item for all the applications.

The redundancy given by the on-board items of equipment is taken advantage of.

The type and the number of communications capable of being implemented is increased.

The management of the communications on board the aircraft is rendered more flexible since it can adapt to different architectures according to the items of equipment available on board.

The present subject matter can apply to the OWAG system referred to above and in the remainder of the description.

The airline companies can make the on-board equipment items communicate with a single server on the ground: the GAMS installed at the location of the operations center of the airline company.

Communications services that are uniform for all the communicating equipment items may be implemented thanks to the re-use of the OWAG solution as already existing.

According to example embodiments, said event is at least one of:
electrical powering on of the aircraft,
a connection to said network of a computer equipment item in charge of aircraft-ground communications of the aircraft, and
a disconnection from said network of a computer equipment item in charge of aircraft-ground communications of the aircraft.

For example, at least one of said items of information exchanged comprises at least one or one of:
an item of priority data respectively associated with the computer equipment items connected to said network,
a network address respectively associated with the computer equipment items connected to said network, and
an override message from a communication management authority.

According to embodiments, the network addresses of the equipment items are taken into account to arbitrate between items of equipment associated with the same priority data.

For example, when an override message from a communication management authority is exchanged, the equipment item associated with said message is determined as being the master equipment item.

The method may furthermore comprise a step of deactivating at least one aircraft-ground communication service further to detecting said event.

For example, said configuring step comprises sending, by at least one equipment item of said network and to said determined master equipment item, at least one message relative to a type of communication handled by said equipment item.

For example, said communication type identifies a communication available at said equipment item, said configuring step further comprising a step of activating said communication available at said equipment item.

The method may furthermore comprise a step of deactivating at least one other communication equivalent to said activated communication, said other communication being available at another equipment item of said network.

For example, said communication type identifies a category of messages, said configuring comprising the handling, by said determined master equipment item, of said category of messages, on behalf of the equipment items of said network.

According to embodiments, the method further comprises a step (305) of determining a backup equipment item on the basis of said exchanged information, said backup equipment item being configured to operate as a master equipment item in case of a fault with the latter.

A second aspect of the subject matter concerns a computer equipment item configured to handle aircraft-ground communications on board an aircraft, in accordance with the first aspect.

Such an equipment item may comprise a processing unit configured to detect a communication management configuration event, exchange information relative to at least one election criterion for electing a master equipment item in a network of computer equipment items in charge of aircraft-ground communications of the aircraft, determine a master equipment item on the basis of said exchanged information, and configure the management of communication on the basis of said determined master equipment item.

For example, an equipment item according to the second aspect may comprise hardware and software components making it possible to run communication applications and run the election mechanism presented above. Thus, an equipment item according to the second aspect participates in the exchanges of the election process as soon as one of the events from among those listed below is verified: the electrical powering on of the aircraft, the connection or the disconnection of an equipment item from the on-board network.

A third aspect of the subject matter concerns a communication system on board an aircraft configured for implementing a method according to the first aspect.

Such a system comprises for example a plurality of equipment items according to the second aspect.

For example, a system according to the third aspect comprises hardware and software components making it possible to run communication applications and run the election mechanism presented above. In order for this system to be elected master in the context of the election process, it is possible to attribute a "weight" to the system and the system may have a unique identifier (for example its MAC address). The election mechanism may use the weights and unique identifiers of all the equipment items participating in the election process to designate the master equipment item for each communication application. Furthermore, a graphical interface may be implemented to provide the pilots and the maintenance teams with the possibility of overriding the automatic election mechanism and of forcing the designation of a master equipment item for each communication application.

A fourth aspect of the subject matter concerns an aircraft comprising an equipment item according to the second aspect and/or a system according to the third aspect.

The objects according to the second, third and fourth aspects of the subject matter provide at least the same advantages as those provided by the object according to the first aspect in its various example embodiments.

BRIEF DESCRIPTION OF THE DRAWINGS

Other features and advantages of the subject matter will appear on reading the present detailed description which follows, by way of non-limiting example, and the appended drawings among which.

DETAILED DESCRIPTION

Figure 1:
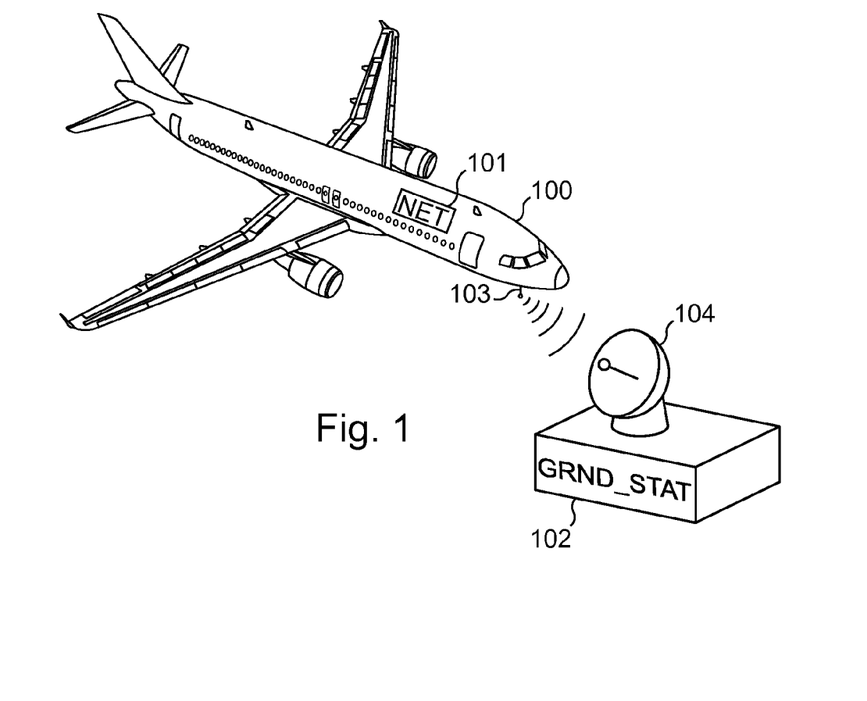
FIG. 1 diagrammatically illustrates a context for implementation of embodiments of the subject matter.

In the general context of implementation of embodiments of the subject matter of FIG. 1, an aircraft 100 comprises a network 101 (NET) of computer equipment items in charge of aircraft-ground communications (referred to as equipment items below). This is for example the NSS system of the aircraft (NSS standing for Network Server System). The computer equipment items may perform communications with a station 102 on the ground (GRND_STAT). For example, this is an operations center of an airline company. The communications between the aircraft and the ground station are implemented by radio communications between respective antennae 103 and 104 of the aircraft and of the ground station.

Figure 2:
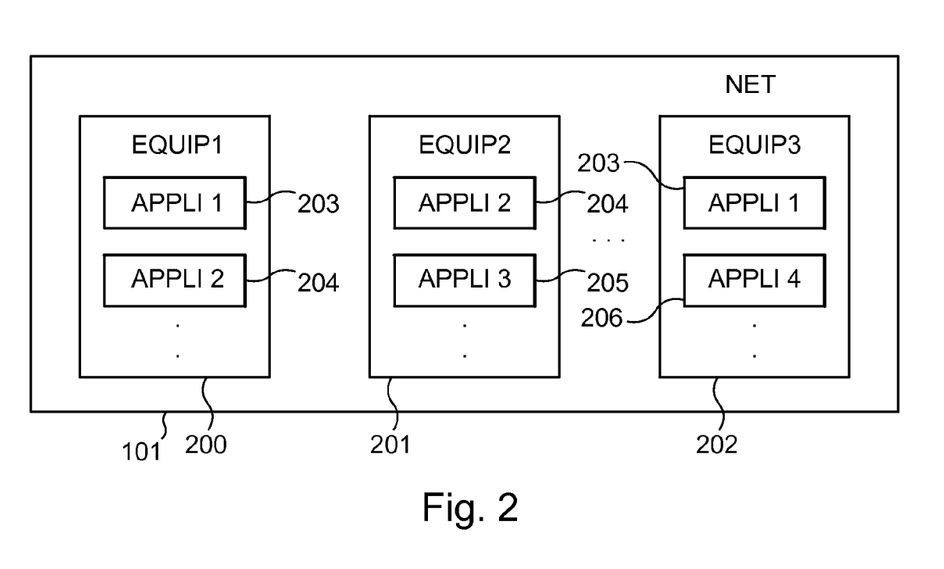
FIG. 2 diagrammatically illustrates a communication network according to some embodiments.

As illustrated by FIG. 2, the network 101 may comprise various types of equipment items. They may be equipment items 200 (EQUIP1) with which the aircraft is initially equipped, for example the ANSU-AFMR server of the NSS. They may be equipment items 201 (EQUIP2), 202 (EQUIP3) integrated into the aircraft network in course of use, for example EFBs which are connected and disconnected according to the flights made.

Each equipment item may implement applications (or computer services), in particular applications communicating with the ground. These applications are for example communication management applications of LGCM type, data exchange applications of OAMS type, or other applications.

The same application may be installed on several computer equipment items. Thus, for example the equipment item 200 comprises an application 203 (APPLI1) and an application 204 (APPLI2). The equipment item 201 in turn comprises the application 204 (also present within equipment item 200) and the application 205 (APPLI3). The equipment item 202 in turn comprises the application 203 (also present within equipment item 201) and the application 206 (APPLI4).

Progressively with the connection of computer equipment items within the network 101, redundancies may thus arise in terms of availability of applications (or application instances). In the example of FIG. 2, the application 203 is present within two equipment items 200 and 202 and may be launched by those two equipment items. In the same example, the application 204 is present within two equipment items 200 and 201 and may be launched by those two equipment items.

In order, in particular, to take advantage of that redundancy while providing uniform implementation of the applications, an election process is implemented for electing one or more "master" equipment items for executing one or more applications.

Figure 3:
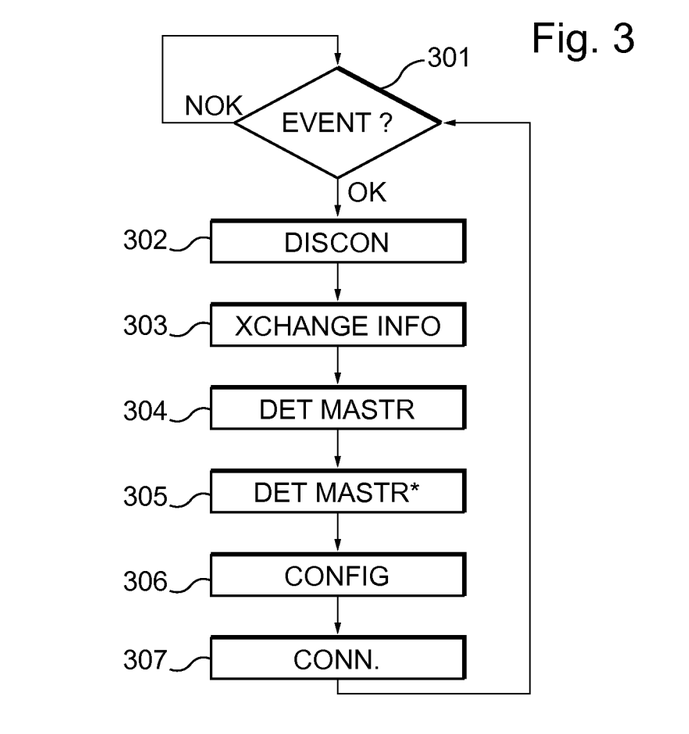
FIG. 3 is a flowchart of steps implemented according to embodiments.

FIG. 3 is a general flowchart of steps that may be implemented in such an election process. These steps may for example be implemented by each equipment item of the network. Thus, it is possible to provide that only the equipment items configured to implement the election processes can be integrated into the network to communicate with the outside of the aircraft. Alternatively, or in combination, on connection of each equipment item of the network a software application is installed enabling the equipment item to implement the election process if it is not configured for such a process. Other measures may be provided as an alternative or in combination.

At an event detecting step 301 (EVENT ?) the election process is verified if a configuration of the communications management on board the aircraft is required to be implemented. This may be an update to that configuration. For example, such an event may be the electrical powering on of the aircraft (or of the network), the connection of a new equipment item within the network, the disconnection of an equipment item, etc. The event may also be the reception of a message indicating that a configuration must be implemented. The message may come from a communications control authority, for example the pilot or a control application which for example has detected a failure on a device. Other types of event may be envisioned.

If the event is detected (OK), the equipment items may be provisionally disconnected from the outside world at a step 302 (DISCONN.) in order to perform the election of the master equipment item. Thus, in the election phase, the equipment items no longer communicate with the outside which may avoid problems of conflicts or data losses before the master equipment item is determined.

The items of equipment next exchange information with each other at a step 303 (XCHANGE INFO) in order to enable them to determine the master equipment item at a step 304 (DET MASTR).

Several types of information may be exchanged. For example, the information may be a priority indicator (or data item) respectively associated with each equipment item. The indicator may be directly associated with the equipment item. In this case, it makes no difference which application is implemented by the equipment item, the priority associated with it is always the same. The indicator may also be indirectly associated with the equipment item via one or more applications that it implements. Thus, in this case, the equipment item is associated with a plurality of applications and may be designated as master for one or more applications depending on the indicators.

The indicator may also be a network address (for example the MAC address). Thus, according to the location to which the equipment item is connected, it may or may not be designated as master.

Among the exchanged information, there may also be an override message from a communications control authority, for example the pilot or a control application.

One or more criteria may be employed, based on the exchanged information, to designate the master equipment item. For example, in case the priority indicators for two equipment items are equal, the MAC address may be used to arbitrate between them. For a further example, the override message may be considered as greater than the other criteria, which may lead to designating the equipment item associated with the message as master, regardless of the other criteria. Other combinations of criteria are possible.

Once the master equipment item has been determined, it is possible to determine another alternative master equipment item. The latter may serve as master equipment item in case of a fault with the master equipment item firstly designated or in case of disconnection thereof. The designation of the alternative master equipment item is then made at step 305 (DET MASTR*) in similar manner to that described for step 304. The equipment item designated as master at step 304 does not participate in step 305.

Once the master equipment item has been determined (and possibly the alternative master equipment items), the equipment items are configured so as to take into account the management of the communications by the master equipment item. This configuration is implemented at step 306 (CONFIG).

For example, this is a matter for each equipment item of declaring the communication applications it implements, or the communication it has at its disposal. Once this type of declaration has been made, the master equipment item may determine the type of communications that it will have to manage on behalf of the other equipment items.

Thus, when several equipment items implement the same communication application, they turn to the master equipment item for the actual carrying out of the communication to the outside.

When the configuration is terminated, the master equipment item is re-connected to the outside world at step 307 (CONN.) for carrying out the communications.

The election mechanism described above may enable one or more master devices to be elected. To be precise, a master device may be read for each application implemented by a plurality of equipment items.

The following portion of the description is given in the context of the OWAG system on a purely illustrate basis. The subject matter is not however limited to that system or to that type of system.

It is considered that the LGCM and OAMS applications of the OWAG system have been installed on the ANSU-AFMR server of the NSS Flight ops domain and also on the computer equipment items connected to the domain. Thus, the LGCM and OAMS applications may be executed on the ANSU-AFMR server, but also on other equipment items such as EFBs (of class 1, 2 or 3).

In accordance with the general process described above, a dialog is set up between the various LGCM and OAMS instances of the domain with the aim of electing a single "Master LGCM" instance (that is to say execution of the LGCM application on a master equipment item for that application) and a single "Master OAMS" instance (that is to say an execution of the OAMS application on a master equipment item for that application), which actually provide the LGCM and OAMS functions on behalf of all the instances of those applications within the NSS Flight ops domain.

If several computer equipment items are configured to execute the OWAG system, "Backup LGCM" and "Backup OAMS" instances may also be designated.

The other LGCM and OAMS instances which execute on the other equipment items of the domain (those which are neither "master" nor "backup") are placed on standby, available to participate in the next election process.

Once the automatic election process has been implemented, a dynamic distribution process is implemented for the communication.

The previously elected master LGCM is informed by the different computer equipment items of the domain, of the list of all the aircraft-ground communication available within the NSS Flight ops domain. These communications may be made available by the aircraft itself (that is to say by the equipment integrated therein), or by computer equipment items connected to the domain (for example EFBs of class 1, 2 or 3, tablet computers, portable computers, etc.).

As an elected equipment item, the Master LGCM has the role of managing all the communication of the domain. Thus, the communication made available by an equipment item of the domain are usable by all the equipment items of that domain.

As for the previously elected Master OAMS, this manages the messages sent and received by the communicating applications of the domain.

With the use of Master and Backup equipment items, a service redundancy mechanism can be taken advantage of.

The Master LGCM and Backup LGCM instances continuously have available the same level of information in order for the Backup LGCM to immediately take over in case of possible disconnection or failure of the computer equipment item on which the Master LGCM instance is executed.

As for the Master OAMS and Backup OAMS instances, these continuously have available the same level of information such that no information to send and in course of being sent is lost or duplicated.

The computer equipment items of the NSS Flight ops domain (natively present or subsequently connected) may communicate with each other and exchange information, in particular for the election mechanism, because they are networked together. These interconnections may be cabled (Ethernet for example) or wireless (WiFi for example).

In document WO 2008/139062, the LGCM software (communications management) and OAMS software (messaging server) of the OWAG system are installed on a single equipment item: the ANSU-AFMR server of the NSS Flight ops domain.

In the present illustrative example, the LGCM and OAMS software is installed and executed on a plurality of (or even on all) computer equipment items of the domain that are capable of executing that software. These are not only the ANSU-AFMR server, but also all the computer equipment items capable of network connection to the domain at a given time: portable computers, EFBs of classes 1, 2 and 3, tablet computers, or other items of mobile equipment.

In accordance with the general description given above, in order to avoid the LGCM and OAMS roles being simultaneously provided by several equipment items, an election phase prior to the actual activation of the LGCM and OAMS services is carried out. Thus, a "Master LGCM" and a "Master OAMS" are elected. The principles described here for LGCM and OAMS could be applied to other types of applications.

The election phase may be carried out at the time of electrical powering on of the aircraft (or more particularly on activating the NSS), the connection of a new computer equipment item to the NSS Flight ops domain (for example when a pilot connects a tablet in the cockpit), the disconnection of a computer equipment item from the domain (for example a pilot disconnects his tablet from the cockpit), or other types of events.

The LGCM and OAMS instances in course of execution on the various equipment items of the domain first of all place themselves in an "inactive" state. That is to say that, temporarily, they communicate only with each other, but no longer communicate with the outside.

The LGCM and OAMS instances enter into a phase of dialog, across the network of the NSS Flight ops domain, in order for a single Master LGCM instance and a single Master OAMS instance to be designated automatically and unambiguously. The above instances that are elected remain in the inactive state in this step.

On installation of the LGCM and OAMS software on the equipment items of the domain, a "weight" is attributed to the LGCM and OAMS instances so as to be used as a criterion for election. This weight (or priority data) may be attributed by the airline company exploiting the aircraft. This weight may be modifiable over time.

Other information may be used, in particular to arbitrate between the equipment items that are equal in terms of another criterion. Thus, for example, in case of equality of the weights attributed to two items of equipment, the MAC addresses of the Ethernet couplers of the computer equipment items may be used to determine an order of preference.

In a first and purely illustrative example, it is considered that the LGCM instance has a weight of "1" on the ANSU-AFMR, a weight of "2" on a class 3 EFB of a co-pilot and a weight of "3" on a tablet of the pilot. It is furthermore considered that the OAMS instance has a weight of "1" on the ANSU-AFMR, a weight of "2" on the co-pilot's class 3 EFB and a weight of "3" on the pilot's tablet.

In this example, at the end of the election process, the LGCM and OAMS instances that run on the ANSU-AFMR server are designated "Master LGCM" and "Master OAMS" since they have been given the highest weight ("1"). It is considered here that the weights are integers and that the weight "1" is the highest, that the weight "2" comes next, and so forth.

In a second and purely illustrative example, it is considered that the LGCM instance has a weight of "1" on the ANSU-AFMR, a weight of "2" on a class 3 EFB of a co-pilot and a weight of "3" on a tablet of the pilot. It is furthermore considered that the OAMS instance has a weight of "1" on the ANSU-AFMR which has a MAC address "B", a weight of "2" on the co-pilot's class 3 EFB and a weight of "1" on the pilot's tablet which has a MAC address "A".

In this example, at the end of the election process, the LGCM instance which runs on the ANSU-AFMR server is designated "LGCM Master" since it has the highest weight ("1") and the OAMS instance that runs on the Pilot Tablet will be designated "Master OAMS" since it has the highest weight "1" with that of the ANSU-AFMR and since it has a MAC address with priority (it is assumed that the MAC address A of the cockpit or piloting station has priority over that of the ANSU-AFMR).

An interface may be provided to the pilots so that, whatever the weights defined in advance, they can force the election of the "Master LGCM" and of the "Master OAMS" onto the equipment item or items that they prefer. Thus, they may send out an override message to attribute the role of master to their equipment items. This override message may thus emanate from a control equipment item, for example in case detection of failure etc.

In the case of several LGCM and OAMS instances running in the NSS Flight Ops domain, the election process continues in order for a "Backup LGCM" instance and a "Backup OAMS" instance to be designated automatically and unambiguously. The above instances that are elected remain in the "inactive" state in this step.

Once the election mechanism has terminated, the various LGCM instances in course of execution inform the Master LGCM and the Backup LGCM of the list of the aircraft-ground communication made available by the computer equipment item on which those instances are running. Thus, the Master LGCM and the Backup LGCM have knowledge of all the communication of the domain which they have to manage. According to the equipment items connected to the domain at a given time, the Master LGCM has more or fewer communication to manage.

In case of several equipment items of the domain providing the same communication (for example a cellular connectivity provided both by a Tablet and by a class 3 portable computer that are connected), the Master LGCM chooses to activate only one and to deactivate the others.

The previously elected LGCM instances remain in the "inactive" state in this step.

The various OAMS instances in course of execution give the Master OAMS the list of all the messages they have to manage. Thus, the Master OAMS centralizes all the messages it has to process. The Backup OAMS synchronizes itself with the Master OAMS in order for it too to have available all the messages to process. The previously elected instances remain in the "inactive" state in this step.

Once these items of information relative to the types of communications have been handled by the software, the Master LGCM and the Backup LGCM go into the "active" state, the other LGCM instances remaining in the "inactive" state.

As from this step, the Master LGCM performs the actual management all the aircraft-ground communication of the domain. For example, this management may be carried out in accordance with the teachings of document WO 2008/139062. Furthermore, as regards the Backup LGCM, this remains ready to take over immediately in case of a fault with the Master LGCM.

Moreover, the Master OAMS and the Backup OAMS pass into the "active" state, the other OAMS instances remaining in the "inactive" state.

On the basis of this step, the Master OAMS communicates with the on-board applications across the various OAMS APIs and with the GAMS server on the ground of the airline company. The Master OAMS performs the actual management all the messages to send/receive. For example, this processing may be carried out in accordance with the teachings of document WO 2008/139062.

The Backup OAMS remains ready to take over immediately in case of a fault with the Master OAMS.

Figure 4:
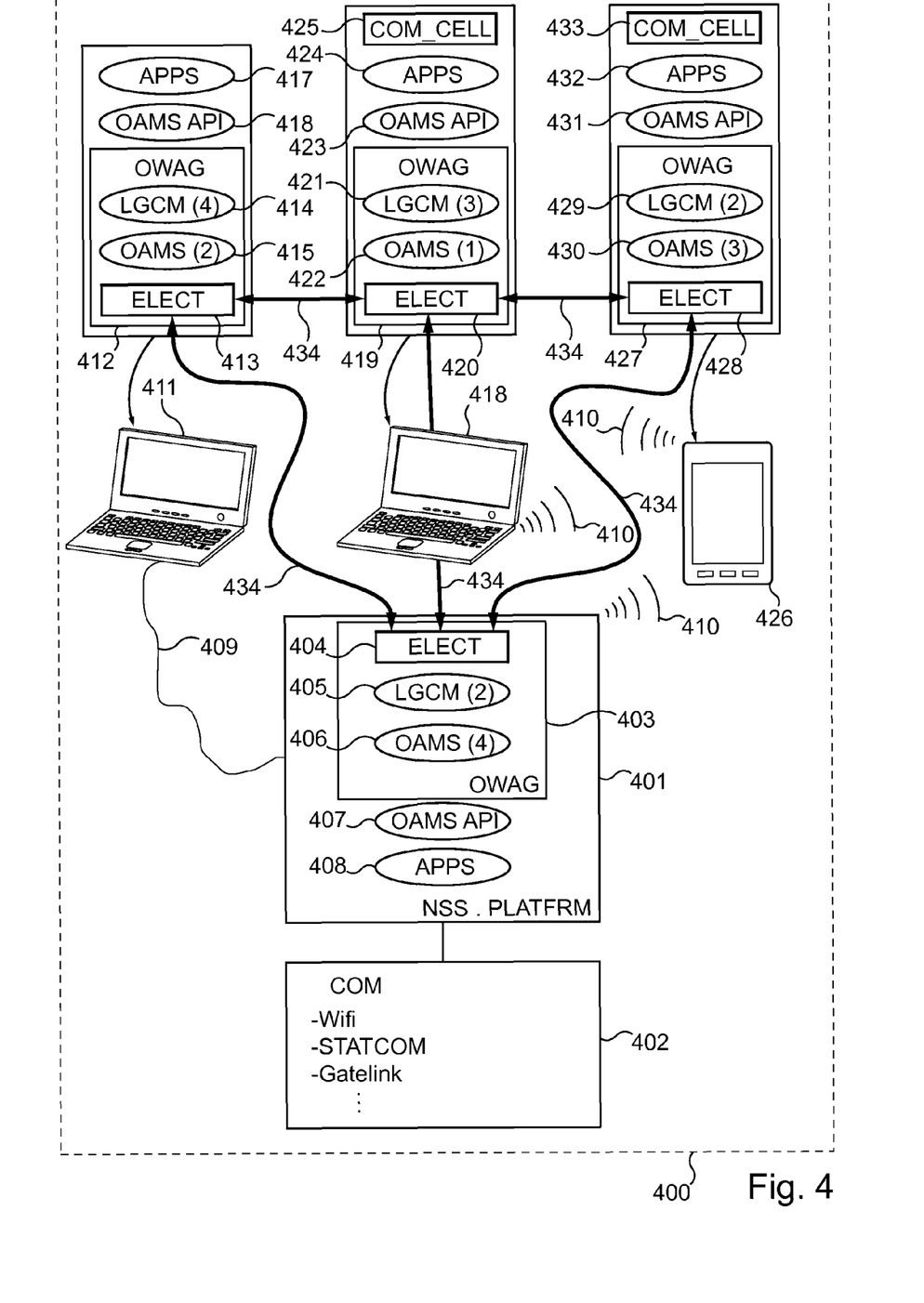
FIG. 4 illustrates a context for implementation of embodiments in an OWAG system.

FIG. 4 illustrates the embodiment context described above. By way of illustration, an NSS network 400 comprises four equipment items configured for the implementation of the OWAG system. These equipment items are connected to the network of the NSS Flight ops domain.

The NSS platform 401 (NSS_PLATFRM) has aircraft-ground communication 402 (COM) at its disposal, for example such as a WiFi Gatelink, a Satcom SBB, a Wired Gatelink, etc.

The platform furthermore comprises a virtual OWAG system 403 (OWAG) with an election engine 404 (ELECT) to implement the election mechanism described above, an LGCM module 405 of which the attributed weight is "2" and an OAMS module 406 of which the attributed weight is "4". The platform also comprises a set of primitive functionalities 407 (OAMS API) for the implementation of the communications and a set of various applications 408 (APPS) for implementing other functionalities.

The platform may perform wired communications 409 or wireless communications 410 with other computer equipment items of the NSS system.

The NSS comprises a class 3 portable computer 411. This is connected to the platform, via the wired communication 409. This portable computer comprises a virtual OWAG system 412 (OWAG) with an election engine 413 (ELECT) to implement the election mechanism described above, an LGCM module 414 of which the attributed weight is "4" and an OAMS module 415 of which the attributed weight is "2". The platform also comprises a set of primitive functionalities 416 (OAMS API) for the implementation of the communications and a set of various applications 417 (APPS) for implementing other functionalities.

Contrary to the NSS platform, the portable computer 411 does not have aircraft-ground communication.

The NSS also comprises a class 2 portable computer 418. This is connected to the platform, via the wireless communication 410. This portable computer comprises a virtual OWAG system 419 (OWAG) with an election engine 420 (ELECT) to implement the election mechanism described above, an LGCM module 421 of which the attributed weight is "3" and an OAMS module 422 of which the attributed weight is "1". The platform also comprises a set of primitive functionalities 423 (OAMS API) for the implementation of the communications and a set of various applications 424 (APPS) for implementing other functionalities.

The portable computer 418 has at its disposal aircraft-ground communication 425 (COM_CELL) of cellular type.

The NSS also comprises a class 2 tablet 426. This is connected to the platform, via the wireless communication 410. This portable computer comprises a virtual OWAG system 427 (OWAG) with an election engine 428 (ELECT) to implement the election mechanism described above, an LGCM module 429 of which the attributed weight is "1" and an OAMS module 430 of which the attributed weight is "3". The platform also comprises a set of primitive functionalities 431 (OAMS API) for the implementation of the communications and a set of various applications 432 (APPS) for implementing other functionalities.

The tablet 426 has at its disposal aircraft-ground communication 433 (COM_CELL) of cellular type.

For the implementation of the election mechanism, the election engines may communicate with each other (arrows 434) via the NSS.

In the example of FIG. 4, the election mechanism leads to attributing the following roles (it is to be recalled that the lower the value of the weight, that is to say close to "1", the greater the priority of the equipment item; it is also to be recalled that the MAC address may serve to arbitrate between the equipment items of the same weight and that the backup equipment items are determined after having determined the master equipment items, for each application):

Master LGCM: Tablet 426 since it has the weight of greatest priority for that application Backup LGCM: NSS platform 401 since it has the weight of greatest priority after the tablet 426 for that application Inactive LGCMs: the portable computers 411 and 418 (since they are neither master nor backup)

OAMS Master: computer 418 since it has the weight of greatest priority for that application OAMS Backup: computer 411 since it has the weight of greatest priority after computer 418 for that application Inactive OAMS: NSS platform 401 and tablet 426 (since they are neither master nor backup).

The mechanism for placing communication of the domain in common leads to giving the Master LGCM the list of the following communication:

WiFi Gatelink (via NSS platform)
Wired Gatelink (via NSS platform)
Cellular (via portable computer 418 and tablet 426). Here, the Master LGCM chooses for example to activate only the Cellular communication available from the computer 418.

A computer program for the implementation of a method according to one embodiment of the subject matter may be produced by the person skilled in the art on reading the flow chart of FIG. 3 and the present detailed description.

Figure 5:
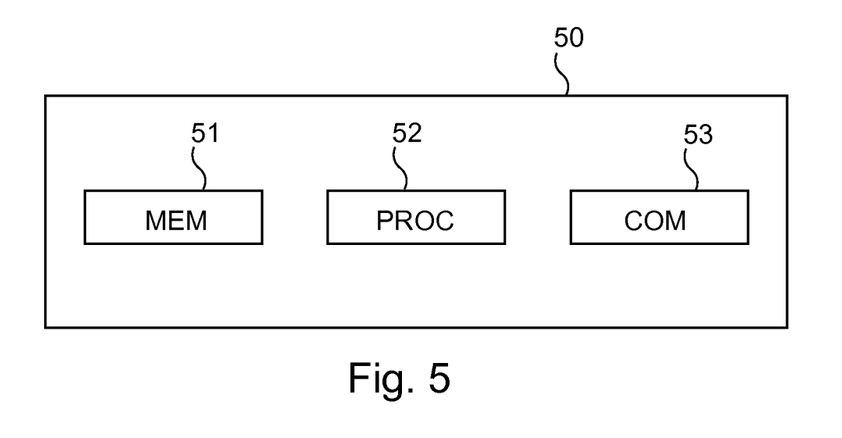
FIG. 5 diagrammatically illustrates equipment items according to some embodiments.

FIG. 5 illustrates an Equipment Item according to some embodiments. The equipment item 50 comprises a memory unit 51 (MEM). This memory unit comprises a random access memory for temporary storage of the computation data used during the implementation of a method according to an embodiment. The memory unit furthermore comprises a non-volatile memory (for example of EEPROM type) for example for storing a computer program according to an embodiment for its execution by a processor (not represented) of a processing unit 52 (PROC) of the equipment item. The memory may also store other data referred to above.

The equipment item furthermore comprises a communication unit 53 (COM) for performing communications, for example for communicating with other equipment items in accordance with the above teachings or with the ground.

The present subject matter has been described and illustrated in the present detailed description with reference to the appended Figures. However the present subject matter is not limited to the embodiments presented. Other variants, embodiments and combinations of features may be deduced and implemented by the person skilled in the art on reading the present description and appended Figures.

To satisfy specific needs, a person competent in the field of the subject matter will be able to apply modifications or adaptations.

In the claims, the term "comprise" does not exclude other elements or other steps. The indefinite article "a" does not exclude the plural. A single processor or several other units may be used to implement the subject matter. The different features presented and/or claimed may advantageously be combined. Their presence in the description or in different dependent claims, does not indeed exclude the possibility of combining them. The reference signs are not to be understood as limiting the scope of the subject matter.

The invention claimed is:

1. A method of configuring communications management on board an aircraft comprising:
   detecting a communication management configuration event;
   exchanging, by one or more computer equipment items each comprising a processing unit, information relative to at least one election criterion for electing a master equipment item in a network of computer equipment items in charge of aircraft-ground communications of the aircraft;
   determining, by the one or more computer equipment items each comprising a processing unit, a master equipment item according to said exchanged information; and
   configuring, by the one or more computer equipment items each comprising a processing unit, communication management according to said determined master equipment item by configuring each of the one or more computer equipment items to route one or more aircraft-ground communication messages to the master equipment item and configuring the master equipment item to manage aircraft-ground communications, including the one or more aircraft-ground communication messages, for each of the one or more computer equipment items.

2. A method according to claim 1, wherein said event is at least one of:
electrical powering on of the aircraft;
a connection to said network of a computer equipment item in charge of aircraft-ground communications of the aircraft; and
a disconnection from said network of a computer equipment item in charge of aircraft-ground communications of the aircraft.

3. A method according to claim 1, wherein at least one of said items of information exchanged comprises at least one or one of:
an item of priority data respectively associated with the computer equipment items connected to said network;
a network address respectively associated with the computer equipment items connected to said network; and
an override message from a communication management authority.

4. A method according to claim 3, wherein the network addresses of the equipment items are taken into account to arbitrate between items of equipment associated with the same priority data.

5. A method according to claim 3, in which when an override message from a communication management authority is exchanged, the equipment item associated with said message is determined as being the master equipment item.

6. A method according to claim 1, further comprising deactivating at least one aircraft-ground communication service further to detecting said event.

7. A method according to claim 1, wherein said configuring comprises sending, by at least one equipment item of said network and to said determined master equipment item, at least one message relative to a type of communication handled by said equipment item.

8. A method according to claim 7, wherein said communication type identifies a communication available at said equipment item, said configuring further comprising activating said communication available at said equipment item.

9. A method according to claim 8, further comprising deactivating at least one other communication equivalent to said activated communication, said other communication being available at another equipment item of said network.

10. A method according to claim 7, wherein said communication type identifies a category of messages, said configuring comprising the handling, by said determined master equipment item, of said category of messages, on behalf of the equipment items of said network.

11. A method according to claim 1 further comprising determining a backup equipment item on the basis of said exchanged information, said backup equipment item being configured to operate as a master equipment item in case of a fault with the latter.

12. A computer equipment item for managing communications on board an aircraft comprising a processing unit configured, by virtue of memory storing a computer program for execution by the processing unit, to detect a communication management configuration event, exchange information relative to at least one election criterion for electing a master equipment item in a network of computer equipment items in charge of aircraft-ground communications of the aircraft, determine a master equipment item on the basis of said exchanged information, and configure the management of communication on the basis of said determined master equipment item by configuring each of the one or more computer equipment items to route one or more aircraft-ground communication messages to the master equipment item and configuring the master equipment item to manage aircraft-ground communications, including the one or more aircraft-ground communication messages, for each of the one or more computer equipment items.

13. A communication system on board an aircraft comprising a plurality of equipment items according to claim 12.

14. An aircraft comprising a system according to claim 13.

* * * * *